United States Patent [19]
Pfeifer

[11] 3,782,848
[45] Jan. 1, 1974

[54] COMBINATION EXPANDABLE CUTTING AND SEATING TOOL

[76] Inventor: John Pfeifer, 1807 Oak Ave., Northbrook, Ill. 60062

[22] Filed: Nov. 20, 1972

[21] Appl. No.: 308,127

[52] U.S. Cl. .............................. 408/156, 408/158
[51] Int. Cl. ......................................... B23b 29/034
[58] Field of Search ................. 408/154, 156, 153, 408/161, 158, 157, 714

[56] References Cited
UNITED STATES PATENTS

| | | | |
|---|---|---|---|
| 2,472,554 | 6/1949 | Volis | 408/154 |
| 2,206,941 | 7/1940 | Cogsdill | 408/156 |
| 1,332,455 | 3/1920 | Auble | 408/156 |

*Primary Examiner*—Gil Weidenfeld
*Attorney*—Charles W. Rummler et al.

[57] ABSTRACT

An expandable tool for a combined seating and cylindrical cutting operation to be performed in a lathe, drill press or jig boring machine having a plurality of radially disposed formed cutters inserted in a slotted tool holder which is expandable by using an ordinary screw driver for screwing a male U.S. Standard thread of a given pitch diameter and number of threads per inch into a female U.S. Standard through-tapped hole having some imperfect lead threads of the same pitch diameter and number of threads per inch centrally disposed in the slotted tool holder for spreading the elements between the slots and the reaming cutting edges therein apart by the screwing of the male thread therein.

5 Claims, 7 Drawing Figures

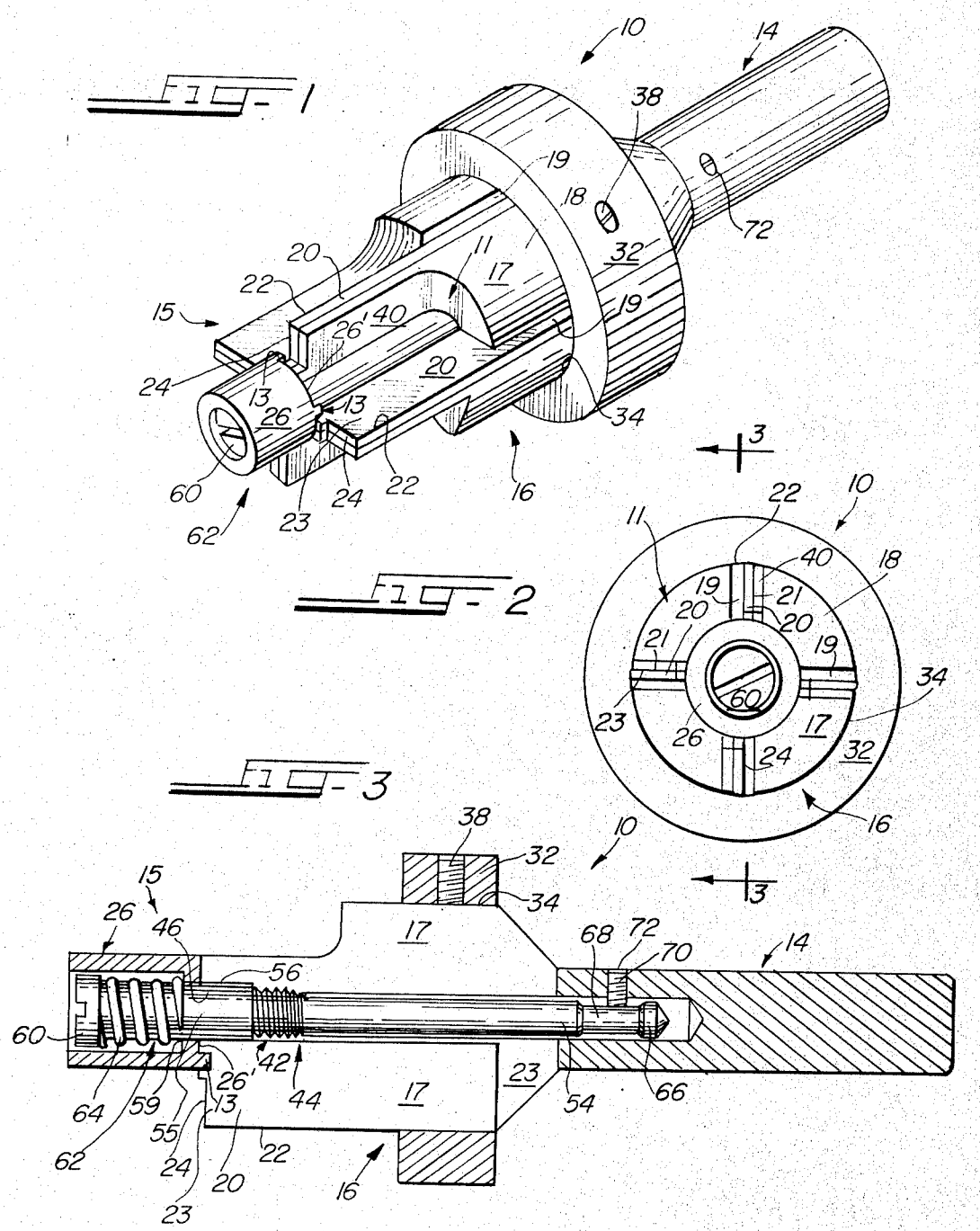

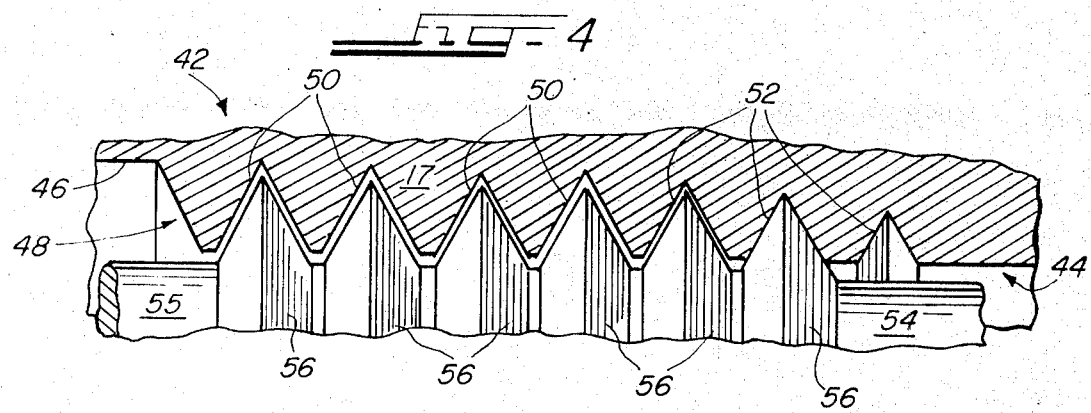
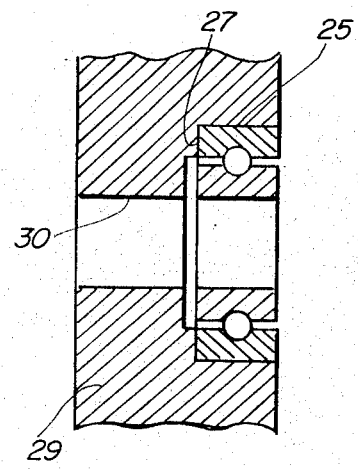
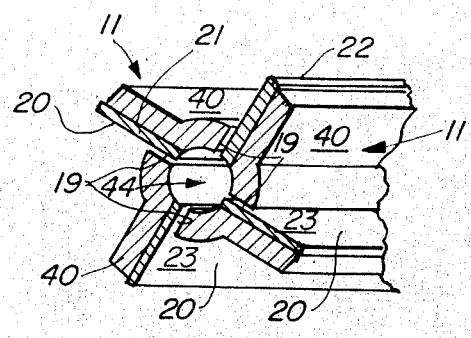
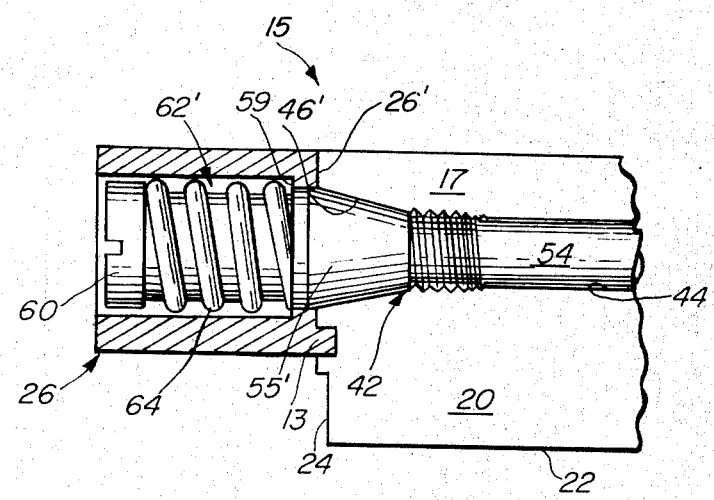

COMBINATION EXPANDABLE CUTTING AND SEATING TOOL

BACKGROUND OF THE INVENTION

Anti-friction bearing mounts in a housing are normally reamed to size for a press fit of the bearing outer race in the housing bore having allowances of 0.0002 to 0.0007 inch interference cylindrical fit for installation of a suitable bearing on a shaft in the housing. A tolerance of 0.0005 inch on the diameter of a bore is difficult to hold for more than but a few parts due principally to wear on the cutting edge of the tool bit and a production run is out of the question where the tool must be reset and reground to size suitable for use on a mass production basis. In due course, because of this situation, quality control techniques in force on the production line are necessary for the ordinary fit-up and dynamic operation of parts on a production basis and the tool must have the capability of adjustment to take up the amount of diametral wear on the cutting edges within the dimensional tolerances allowed for the tool life considered economic. Low-cost adjustable production tooling which can be compensated for diametral wear during use and extend tooling life is essential to all manufacturing planning by the modern tool engineer if production costs are to be economic and the price of the item is to be right in the marketplace.

It is also economic from a production standpoint to provide tooling which combines operations. In the seating of the outer race of anti-friction bearings in a housing, an end-milling operation is involved. If the same tool is to mill the seat in the housing as well as machine the bore for the bearing, endface cutting edges must be provided which are formed to the shape and contour of the seat desired.

It is also economic from a production engineer's standpoint to have production tooling which does not require special hand tools for the adjustment thereof.

There is thus an established need for a simple, low-cost, anti-friction bearing combination seating and reaming tool which can be easily adjusted with common tools readily available for diametral wear on the cutting edges of the reamer.

SUMMARY OF THE INVENTION

The gist of this invention lies in a differential thread expander comprising a female U.S. Standard through-thread tapped bore having several imperfect lead threads therein which is centrally located in a radially-slotted tool holder carrying radially-disposed cutter blades for reaming thereon by using an ordinary screwdriver, and which is expandable for the take-up of diametral wear on the cutting edge thereof to screw a male U.S. Standard threaded bolt of the same pitch diameter and number of threads per inch thereof into the corresponding imperfect female lead threads. A formed cutting edge on the end faces of the radially-disposed reaming cutters mills the seat for a bearing installation in a housing at the same time it reams the bearing bore.

BRIEF DESCRIPTION OF THE DRAWINGS

FIG. 1 shows a perspective view of the combination seating and reaming tool which is adjustable for wear that is the subject invention;

FIG. 2 shows an end view of the same showing the end cutters for seating;

FIG. 3 is a vertical cross-sectional view of one differential thread expander of the reamer along line 3—3 of FIG. 2;

FIG. 4 is a fragmentary blow-up of vertical cross-section of the male and imperfect female U.S. Standard thread thereof which spread the slotted tool holder and the cutter blades thereon in the take-up of wear thereof;

FIG. 5 is a fragmentary vertical cross-sectional view of a seat and reamed bore in a housing installing an anti-friction bearing;

FIG. 6 is a fragmentary perspective cross-sectional view taken along line 6—6 of FIG. 3; and FIG. 7 is a fragmentary vertical cross-sectional view of another differential thread expander from that shown in FIG. 3.

DESCRIPTION OF THE PREFERRED EMBODIMENT

Referring in particular to FIG. 1, the combination seating and adjustable cylindrical cutting tool 10 comprises a cylindrical drive shank end 14 for chucking into a suitable lathe, jig boring machine or drill press, and a cutting end 15. A tool holder 16 having a cylindrical body member 17 for supporting the cutting end 15 is connected to and concentric with the shank 14 and has a plurality of radially-disposed segmented elements 18 therein with radial slots 19 disposed therebetween, as shown in FIGS. 1, 2 and 6. A cutting load side 21 of segmented elements 18 lies on the side thereof in a counterclockwise sense when viewed from the cutting end 15, as shown in FIG. 2. A chip relief side 11 lies between circumferentially successive segmented elements 18 therefrom adjacent to the cutting end 15, as shown in FIG. 1. Slots 19 are open at the cutting end 15 and extend to and terminate at the juncture of the shank end 14 with the body member 17, as shown in FIG. 3. Cutter blades 20 of tool steel, which have cylindrical cutting edges 22 and formed end face cutting edges 24 on cutting faces 23, as shown in FIGS. 1, 2 and 6, are inserted in and brazed to the load sides 21 of respective slotted segments 18 with cutting edges 22 and 24 longitudinally and radially disposed thereon for performing the combined operations of cutting of a bearing bore 25 and milling of a bearing seat 27 in housing 29, as shown in FIGS. 2 and 5. The outside diameter of the cylindrical cutting edges 22 is only slightly greater than that of the cylindrical tool holder 16. A hollow pilot member 26, having a back face 26' with an internal shoulder 59 thereon which concentrically bears on shank 55 of bolt 54 (see FIG. 3), is keyed by four nibs 13 projecting from the back face 26' which overlap cutting edges 24 and bear against the cutting faces 23 of the cutter blades 20 on the cutting end 15 to insure rotation of the pilot 26 with the drive shank 14 as it cuts seat 27 and bore 25 in concentric relation with the tool holder 16, as shown in FIGS. 1, 2 and 3. Cylindrical shank 55 of head 62 of bolt 54 pilots in counterbore 56 in close concentric relation therewith. A pilot bore 30 in the housing 29 is in concentric relation with the bearing bore 25, as shown in FIG. 5. Pilot 26 on the cutting end 15 of the tool holder 16 pilots the pilot bore 30 in the housing 29 for maintaining concentricity of the bearing bore 25 with relation to the pilot bore 30 during the reaming operation thereof. Pilot 26 is in close concentric relation with the outside diameter of cylindrical cutting edges 22.

A cylindrical collar 32 having a bore 34 which is only slightly greater than the outside diameter of the cylindrical cutting edges 22 bears a sliding relation over this outer diameter of the body or housing of the tool holder 16. A set screw 38 which is radially disposed in and threaded to the collar 32 locks the collar 32 to the outside diameter of the tool holder 16.

A plurality of cutter blade back-up plates 40 which are in part an extension of the load side 21 of the segmented elements 18 on the body 17 of the tool holder 16 to the cutter end 15 are structurally a part thereof and are joined to the back face 21 of the cutter blades 20 by brazing on the side opposite the cutting face 23 in support thereof, as shown in FIG. 6.

A differential thread expander 42, as shown in FIGS. 3 and 4, comprises a stepped bore 44 having a cylindrical counterbore 46 which is centrally disposed in the body 17 and extends from the cutting end 15 and up into the shank end 14 adjacent to the juncture of body 17 therewith, as shown in FIG. 3. A female U.S. Standard through-tap thread 48 is tapped in bore 44 to a depth giving several fully-formed threads 50 of standard root and external diameters and in addition giving several imperfectly formed lead threads 52 of standard root but progressively decreasing external diameters corresponding to the lead threads existing on all U.S. Standard through taps, as shown in FIG. 4.

Whereas all U.S. Standard male and female mating threads normally have plus working clearances for thread fit-up, the fit-up of the bolt member 54 with all perfect male threads 56 in a female bore 44 having imperfect lead threads 52 increasingly interferes as the bolt 54 is screwed further into the bore 44. A fit-up of bolt 54 in bore 44 that increasingly interferes results in an increasing spreading force on segmented elements 18 as the external diameter of the perfect male threads 56 bears more heavily on the progressively smaller external diameters of the imperfect female lead threads when the collar 32 is not tightened on the body 17. This tends to spread the slotted elements 18 and the back-up plate 40 extensions mounted thereto and to expand the cutting blades 20 joined thereon as the bolt 54 is screwed into the bore 44.

A flat fillister head 60 of a diameter which is sufficiently small to fit within the hollow pilot 26 is mounted to the head end 62 of bolt 54 adjacent the outer end of the pilot 26, as shown in FIGS. 1, 2 and 3. A compression spring 64 concentrically mounts on the head end 62 of the bolt 54 within the hollow pilot 26 between the slotted fillister head 60 and the internal shoulder 59 for retaining the pilot 26 on the keyed cutting end 15 of the hollow pilot member 26, as shown in FIG. 3.

An elongated groove 68 is cut in the tail end 66 of the fit-up bolt 54, and a threaded bore 70 is radially disposed in the drive shank 14 in a location to line up with the groove 68 when the bolt 54 is assembled in the bore 44 in the body 17. A set screw 72 is screwed in threaded bore 70 to contact the groove 68 in the bolt 54 to retain the bolt therein, as shown in FIG. 3, and further to assist in locking the bolt in a set position.

A self-locking species of the differential thread expander 42 comprises a tapered counterbore 46' leading to female threaded bore 44 in the body 17 and a tapered head end 62' on the bolt 54 slidably mounted therein so that as the conical shank 55' of head end 62' is screwed into concentric seating relationship with the tapered counterbore 46' as discussed before in the case of the cylindrical counterbore 46, the bolt 54 is locked therein from turning in the female threaded bore 44.

In the operation of the combination expandable cutting and seating tool, the fit-up bolt 54 is backed off out of engagement with imperfect female threads 52. The bolt 54 is turned up until the opposed cutting edges 22 of the cutter blades 20 are equal to the diameter of the seat 25 to be cut in the housing 29. This is accomplished by the interference meshing of the male threads 56 on bolt 54 with the imperfect female threads 52 in the body 17. A slight turn of bolt 54 in either direction by a screwdriver inserted in the fillister head screw 60 will increase or decrease the diametral distance between opposed cutting edges 22. Once the distance between opposed cutting edges is determined, the collar 32 is slipped over the body 17 and the set screw 38 is bottomed to lock the assembly.

As the expandable cutting tool is used, cylindrical wear takes place on the cutting edges 22. Such wear can be compensated for by first releasing the collar 32 by loosening set screw 38 and then taking up on the engagement of the male threads 56 of fit-up bolt 54 in imperfect female threads 52 in the body 17 by screwing slotted fillister head screw 60 further in the bore 44. As the bolt 54 is screwed into imperfect female threads 52, an increasing spreading force on the segmented elements 18 increases the external diameter of the cylindrical cutting edges 22 to the original size thereof thereby compensating for the wear.

It is to be understood that numerous details may be altered or omitted without departing from the spirit of this invention as defined by the following claims.

I claim:

1. A combination expandable cylindrical cutting and seating tool having a drive shank end and a cutter end in common concentric relation comprising:
   a. a radially segmented body member mounted to the drive shank end having a bore concentrically located therein opening to the cutter end of the tool and terminating in the shank end,
   b. a plurality of cutter blade back-up plates having a cutting load side fixedly mounted to the segmented body member and extending therefrom between the body member and the cutter end,
   c. a plurality of cutter blades joined to the back-up plates on the cutting load side,
   d. a plurality of imperfect female screw threads in said bore adjacent to the opening thereof to the cutter end having a constant root diameter and decreasing in external diameter in the direction of the lead of the screw, and
   e. a bolt having a head end and a plurality of perfect male screw threads for engaging said imperfect female screw threads in said bore,
   whereby the screwing of the male threads of the bolt in the direction of the lead of the screw increasingly interferes with the female threads in the bore of the body member to expand the segments and the cutter blades mounted thereon.

2. In the expandable cylindrical cutting and setting tool as set forth in claim 1 wherein the bolt comprises:
   a. a cylindrical bore in the bore opening to the cutter end of the tool in concentric relation therewith, b. a cylindrical shank on the head end of the bolt in concentric relation therewith piloting in said cylindrical counter bore, and c. a hollow pilot member mounted on the cylindrical shank of the bolt and having a back face adjacent the cutter end in concentric relation therewith.

3. In the expandable cylindrical cutting and seating tool as set forth in claim 2 wherein the pilot member comprises a plurality of nibs projecting from the back face of the pilot member overlapping the cutter blades on the cutting load side.

4. In the expandable cylindrical cutting and seating tool as set forth in claim 1 wherein the bolt comprises:

a. a tapered counterbore in the bore opening to the cutter end of the tool in concentric relation therewith, b. a tapered shank on the head end of the bolt in concentric relation therewith piloting in said tapered counter bore, and c. a hollow pilot member mounted on the cylindrical shank of the bolt and having a back face adjacent the cutter end in concentric relation therewith.

5. A combination expandable cylindrical cutting and seating tool having a drive shank end and a cutter end in common concentric relation comprising a tool holder having a cylindrical body member connected to and concentric with the shank, a plurality of radially-disposed segmented elements therein with radial slots disposed therebetween having a cutting load side lying on the side thereof in a counterclockwise sense when viewed from the cutting end, a chip relief side lying on the opposite side of the segmented elements adjacent to the cutting end, a plurality of slots opening at the cutting end and extending to and terminating at the juncture of the shank end with the body member, a plurality of cutter blades having a cylindrical cutting edge and formed end face cutting edge on the cutting face inserted in and brazed to the load sides of said respective slotted segments with cutting edges radially disposed therein, the outside diameter of the cylindrical cutting edge only slightly greater than that of the cylindrical tool holder, a hollow pilot member having a back face with an internal shoulder thereon concentrically bearing on a shank of a through bolt having a head end and keyed by four nibs projecting from the back face thereof overlapping said cutting edges and bearing against said cutting faces of the cutter blades in concentric relation therewith, a pilot bore in the housing in concentric relation with the bearing bore, a pilot on the cutting end of the tool holder piloting the pilot bore in the housing, a cylindrical collar having a bore slightly greater than the outside diameter of the cylindrical cutting edges of said cutter blades bearing a sliding relation over said outer diameter when the cutter blades are inserted in respective slotted elements of the tool holder and the bore of the collar is slid thereover, a set screw radially disposed in and threaded to the collar locking the collar to the outside diameter of the tool holder, a plurality of cutter blade back-up plates in extension of the load side of the segmented elements on the body of the tool holder to the cutter end structurally joined to the back face of the cutter blades on the side opposite the cutting face in support thereof, a differential thread expander comprising a stepped bore having a cylindrical counter bore centrally disposed in the body and extending from the cutting end up into the shank end adjacent to the juncture of the body therewith, a female U.S. Standard through-tap thread tapped in the bore to a depth giving several fully-formed threads of standard root and external diameters and giving several imperfectly formed lead threads of standard root but progressively decreasing external diameters, a flat fillister head on said through-bolt of a diameter of fit within the hollow pilot mounted to the head end of said through-bolt adjacent the outer end of the pilot, a compression spring concentrically mounted on the head end of the bolt within the hollow pilot between the fillister head and the internal shoulder for retaining the pilot on the keyed cutting end of said hollow pilot member, an elongated groove cut in the tail end of the through-bolt, a threaded bore radially disposed in the drive shank in a location lining up with the groove when the bolt is assembled in the bore in the body, a set screw screwed in threaded bore contacting the groove in the bolt retaining the bolt therein.

* * * * *